(12) United States Patent
Takayanagi et al.

(10) Patent No.: US 7,140,786 B2
(45) Date of Patent: Nov. 28, 2006

(54) METHOD FOR FUSION SPLICING OPTICAL FIBERS AND FUSION SPLICER

(75) Inventors: Hiroshi Takayanagi, Yokohama (JP); Kazunari Hattori, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 11/288,430

(22) Filed: Nov. 29, 2005

(65) Prior Publication Data

US 2006/0133745 A1   Jun. 22, 2006

(30) Foreign Application Priority Data

Nov. 30, 2004   (JP)   ............... 2004-346590

(51) Int. Cl.
*G02B 6/255*   (2006.01)
*C03B 37/15*   (2006.01)

(52) U.S. Cl. .......................... 385/97; 65/407
(58) Field of Classification Search ............ 385/96–97; 65/377–378, 407
See application file for complete search history.

(56) References Cited

U.S. PATENT DOCUMENTS

| | | |
|---|---|---|
| 4,948,412 A | 8/1990 | Yamada et al. |
| 5,009,513 A * | 4/1991 | Onodera et al. ............... 374/31 |
| 5,638,476 A | 6/1997 | Zheng |
| 6,230,522 B1 * | 5/2001 | Ruegenberg .................. 65/377 |
| 6,294,760 B1 * | 9/2001 | Inoue et al. ................. 219/383 |

FOREIGN PATENT DOCUMENTS

| | | |
|---|---|---|
| EP | 1039319 A | 3/2001 |
| EP | 1385029 A | 1/2004 |
| JP | 60-111205 A | 6/1985 |
| JP | 60-195505 A | 10/1985 |
| JP | 07-159643 A | 6/1995 |

* cited by examiner

*Primary Examiner*—Michelle Connelly-Cushwa
*Assistant Examiner*—Chris Chu
(74) *Attorney, Agent, or Firm*—Global IP Counselors, LLP

(57) ABSTRACT

A method and apparatus capable of fusion splicing optical fibers to have a low loss or a prescribed loss. The method includes (a) detecting fiber positions and core positions of optical fibers to be spliced at an abutting position and a fiber offset that is caused when said optical fibers are in core alignment (b) determining the self-alignment ratio corresponding to the preferred melted condition value based on a predetermined expression for a relationship between melted condition value and self-alignment ratio, (c1) determining an intentional offset that achieves a prescribed splicing loss based on the fiber offset and the self-alignment ratio, (d1) aligning the core positions by offsetting the intentional offset value, and (e1) heating and fusing the optical fibers.

3 Claims, 9 Drawing Sheets

Before heating

After heating

Before splicing

After splicing

○ Single Mode fiber
□ Dispersion shifted fiber
△ Fluorine added cladding fiber

After core alignment

Before fusion splicing

After fusion splicing

After core alignment

Before fusion splicing

After fusion splicing

After fusion splicing

METHOD FOR FUSION SPLICING OPTICAL FIBERS AND FUSION SPLICER

BACKGROUND OF THE INVENTION

1. Field of the Invention

The present invention relates to a method for abutting and fusion splicing the splicing ends of optical fibers and an apparatus used in the method.

2. Description of the Background Art

When splicing ends of two optical fibers that are to be spliced to each other are melted, melting is usually brought about after aligning so that the respective core positions of the two optical fibers correspond. Alignment that is carried out in order to align the core positions is referred to in this specification as "core alignment". When the core center and the fiber center do not correspond (when the core is decenterd), splicing will be performed in a state in which the positions of the two fibers are offset (condition in which the shapes of the fibers are offset) even though the positions of the two optical fiber cores are aligned to each other. In this case, the two optical fibers move so that the offset in the shapes is minimized due to the self-alignment effect (effect whereby offset at the external surface of the fibers is minimized due to surface tension of the optical fibers that are in a heated and melted state), which causes offset in the core positions (core offset) that had been in core alignment, and splicing loss thus increases.

Various proposals have been made with the aim of reducing core offset. Japanese Patent Application Publication No. S60-195505, for example, discloses reducing the heating power (discharge time, discharge current) used for melting when the core decentering is significant to prevent large core offset, and increasing heating power when core decentering is small. Japanese Patent Application Publication No. S60-111205 discloses estimating the amount of relative change in the positions of the two fibers due to the self-alignment effect (self-alignment value) that occurs when the optical fibers are fusion spliced, and offsetting the optical fibers prior to heating and melting so as to compensate for the self-alignment value.

When optical fibers are fusion spliced by discharge heating, a test discharge is usually carried out prior to fusion splicing in order to determine the appropriate heating level for melting the optical fibers. However, after performing the test discharge one time, subsequent test discharges are often omitted. Optical fibers tend to melt more by heat when additives such as fluorine are added in the cladding material and, for this reason, the self-alignment value of optical fibers is not uniform and depends on the type of optical fiber. In addition, due to the surrounding environment such as the temperature of the surroundings or wind present during the fusion splicing, it is not always the case that there is a constant relationship between the heating power and the melted state of the optical fiber.

In addition, there are many cases where a worker does not know the type of optical fibers to be spliced or whether there is core decentering. Consequently, as the number of types of optical fibers used increases, which is recently the case, it becomes difficult to set the intentional offset that will compensate for the self-alignment value.

SUMMARY OF THE INVENTION

An object of the present invention is to provide a method and an apparatus that allow optical fibers to be fusion spliced so that the connected portion has a small loss or a prescribed loss.

To attain this object, there is provided an optical fiber fusion splicer comprising (a) position detection means for detecting the core position and fiber position in the abutting point of optical fibers that are to be spliced together, and obtaining the fiber offset that is caused when the optical fibers are in core alignment, (b) alignment means for aligning the optical fibers, (c) heating means for heating and fusing the optical fibers, (d) melted condition value detection means for inspecting and measuring the melted condition value of the optical fibers, (e) self-alignment value calculation means for obtaining the self-alignment ratio that corresponds to the preferred melted condition value based on a predetermined expression for a relationship between the melted condition value and the self-alignment ratio, and calculating the self-alignment prediction value from the self-alignment ratio and the fiber offset measured by the position detection means, and (f) control means for determining the intentional offset that achieves prescribed splicing loss, based on the self-alignment prediction value and controlling the alignment means.

In another aspect, the present invention provides a method for fusion splicing optical fibers having the steps of (a) detecting fiber positions and core positions of optical fibers to be spliced at an abutting position and a fiber offset that is caused when said optical fibers are in core alignment (b) obtaining the self-alignment ratio that corresponds to the preferred melted condition value based on a predetermined expression for a relationship between the melted condition value and the self-alignment ratio, (c1) obtaining the intentional offset that achieves the prescribed splicing loss based on the aforementioned fiber offset and the self-alignment ratio, (d1) aligning the core positions by offsetting by the intentional offset, and (e1) heating and fusing the optical fibers.

There is also provided a method for fusion splicing optical fibers fusion splicing method having, subsequent to step (b), the steps of (c2) obtaining, from the aforementioned fiber offset and the aforementioned self-alignment ratio, the predicted loss and the core offset that results when fusion splicing is performed in a state in which the optical fibers are in core alignment, (e2) determining whether or not fiber position correction is necessary by comparing the aforementioned predicted loss and a specified loss, and (f2) when necessary, determining, from the aforementioned fiber offset and the aforementioned self-alignment ratio, the intentional offset that achieves the prescribed loss, and heating and fusing the optical fibers in a state in which the core positions are offset by the intentional offset, and (g2) when not necessary, heating and fusing the aforementioned optical fibers while the optical fibers are in core alignment.

BRIEF DESCRIPTION FO THE DRAWINGS

These and other features, aspects, and advantages of the present invention will become better understood with regard to the following description, appended claims, and accompanying drawings.

FIG. 1A shows the condition prior to test discharge, and FIG. 1B shows the condition after test discharge.

FIG. 2A shows the condition prior to fusion splicing, and FIG. 2B shows the condition after fusion splicing.

FIG. 4A shows the condition after core alignment, FIG. 4B shows the condition after axial offset, and FIG. 4C shows the condition after fusion splicing.

FIG. 5 is a schematic diagram that describes another embodiment of the method for fusion splicing optical fibers according to the present invention, where

DETAILED DESCRIPTION OF THE INVENTION

In performing the offset compensation of optical fibers to be fusion spliced, it is necessary to know the melting characteristics of the optical fiber. The melting characteristics include the relationship between melted condition value (e.g., melt back) of an optical fiber optical fiber and discharge power, and the relationship between self-alignment ratio of an optical fiber and discharge power. By obtaining these relations in advance of fusion splicing, it is possible to carry out axial offset compensation appropriately, allowing fusion splicing to be performed with a prescribed splicing loss.

Figure 1A:
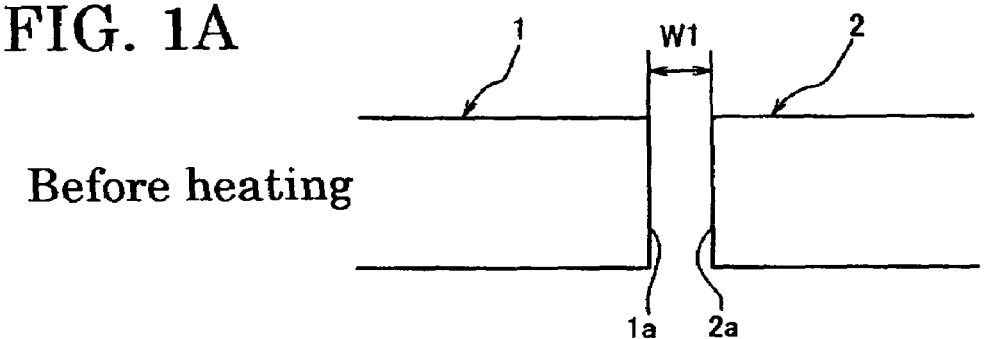
FIGS. 1A and 1B are schematic diagrams that describe melt back, where
Figure 1B:
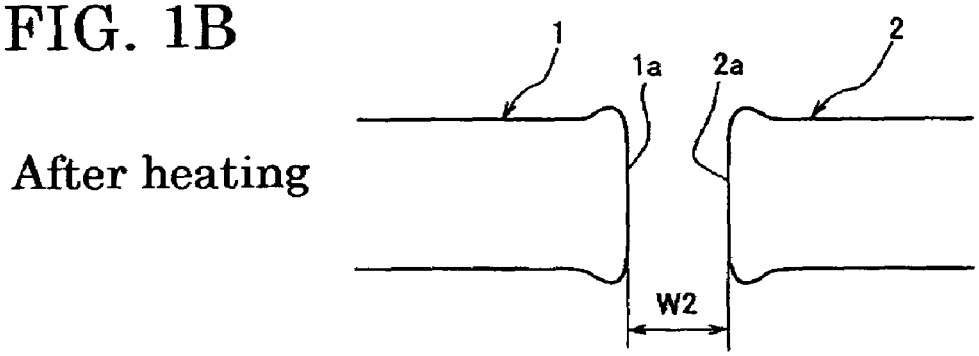
Figure 2A:
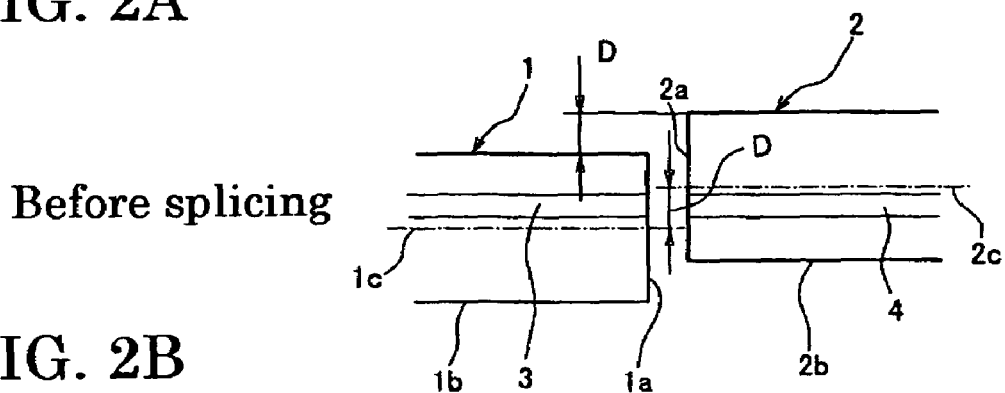
FIGS. 2A and 2B are schematic diagrams that describe a self-alignment ratio, where
Figure 2B:
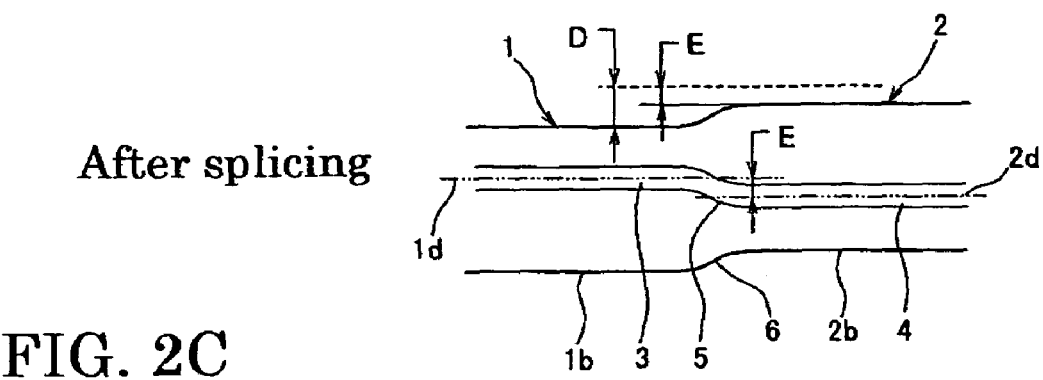

FIGS. 1A and 1B are schematic diagrams describing melt back, where FIG. 1A shows the condition before test discharge, and FIG. 2B shows the condition after test discharge. In FIG. 1A, the first optical fiber 1 and second optical fiber 2 are in an abutting arrangement, with a gap W1 provided between the splicing ends 1a and 2a. When test discharge is carried out, the splicing ends 1a and 2a retract due to melting, and the gap changes to W2 (FIG. 1B). The difference between gap W1 and gap W2 (W2−W1) is the melt back.

Figure 1C:
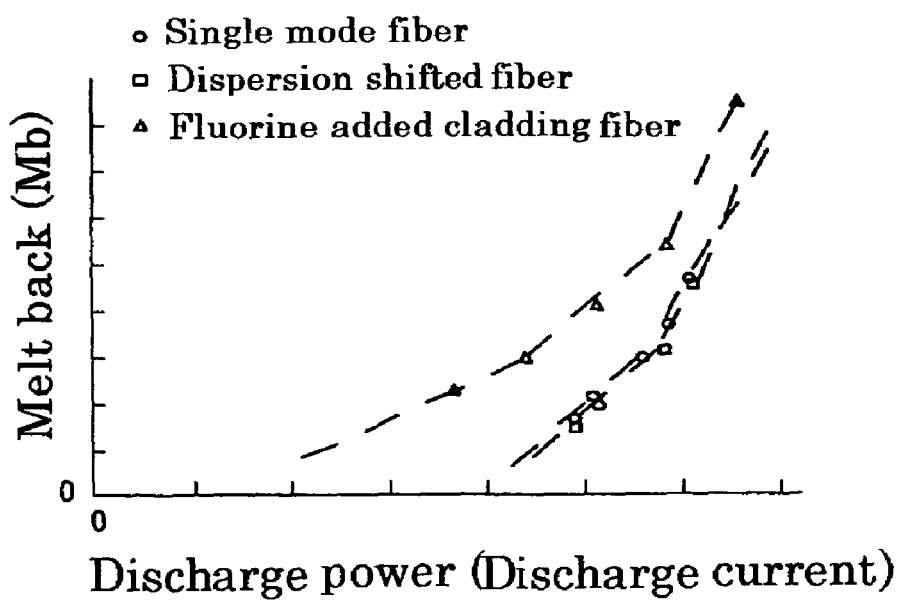
FIG. 1C is a graph showing the relationship between discharge current and the melt back.

The melt back changes depending on the heating amount. FIG. 1C is a graph showing the relationship between the discharge power (discharge current) and the melt back. The melt back has nearly a quadratic relationship relative to the discharge power, but differs depending on the type of optical fiber. In particular, silica glass containing fluorine melts easily. Thus, the melt back of an optical fiber having fluorine-added cladding is greater as compared with that of usual single-mode optical fibers or dispersion-shifted optical fibers, when the discharge power is the same.

FIGS. 2A and 2B are schematic diagrams that describe the self-alignment ratio, where FIG. 2A shows the condition prior to fusion splicing, and FIG. 2B shows the condition after fusion splicing. When optical fibers are fusion spliced, the splicing ends 1a and 2a are usually heated and melted after the cores of the first optical fiber 1 and second optical fiber 2 are aligned, and fusion is then carried out by being pressed toward each other. However, as shown in FIG. 2A, it is often the case that the cores 3 and 4 are decentered with respect to the fiber centers 1c and 2c, and when the cores 3 and 4 are aligned, an offset results between the fiber centers 1c and 2c. Usually, the glass outer diameters of the optical fiber 1 and optical fiber 2 are the same. Therefore, the offset of the fiber centers translates directly into an offset of the fiber shapes. The amount of the fiber center offset or the fiber shape offset is referred to as the fiber offset D.

When the shapes of the optical fibers 1 and 2 are in an offset state and the splicing ends 1a and 2a are melted and abutted by pressing toward each other, as shown in FIG. 2B, the self-alignment effect acts on the surfaces 1b and 2b of the fiber fused part 6, whereby the fiber offset D is reduced. The amount of E by which the fiber offset D decreases due to the self-alignment effect is referred to as the self-alignment value, and the ratio E/D is referred to as the self-alignment ratio. As shown in FIG. 2B, due to the self-alignment effect, the core offset E results in cores 3 and 4, and the core centers 1d and 2d that have been linearly aligned prior to the fusion become offset. Since the core offset E occurs in a short range of the fused part 5 of the cores where the cores 3 and 4 are connected, a bending results in the core axis of the optical fiber, leading to an axis offset loss.

Figure 2C:
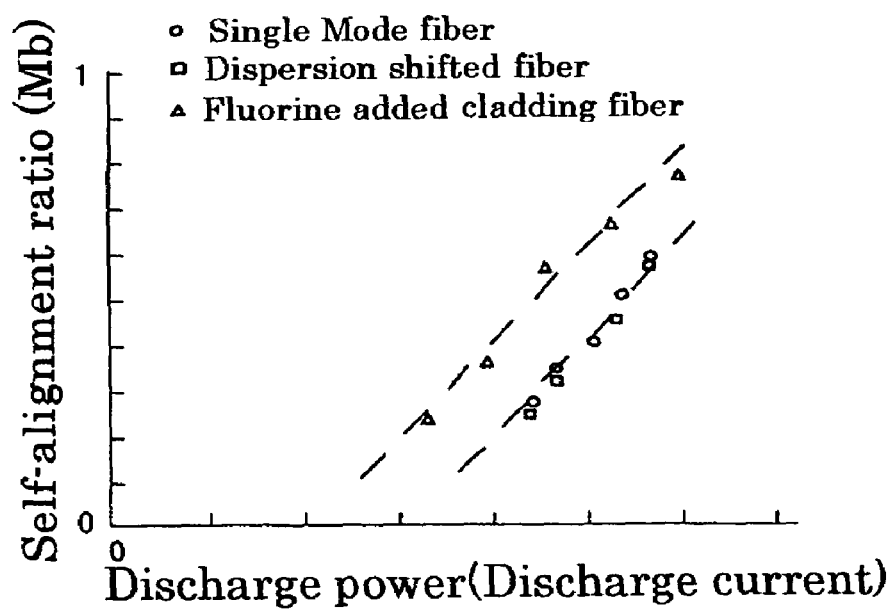
FIG. 2C is a graph showing the relationship between the discharge current and the self-alignment ratio.

The self-alignment ratio varies depending on the heating amount. FIG. 2C is a graph showing the relationship between the discharge power (discharge current) and the self-alignment ratio. The self-alignment ratio is in a nearly linear relationship with respect to the discharge power, and although the self-alignment ratio increases when fusion splicing is carried out with a high discharge power, the values vary depending on the type of optical fiber. In particular, fluorine-doped cladding fibers have a greater self-alignment ratio at the same discharge power than those of ordinary single-mode optical fiber or dispersion-shifted optical fibers.

Figure 3:
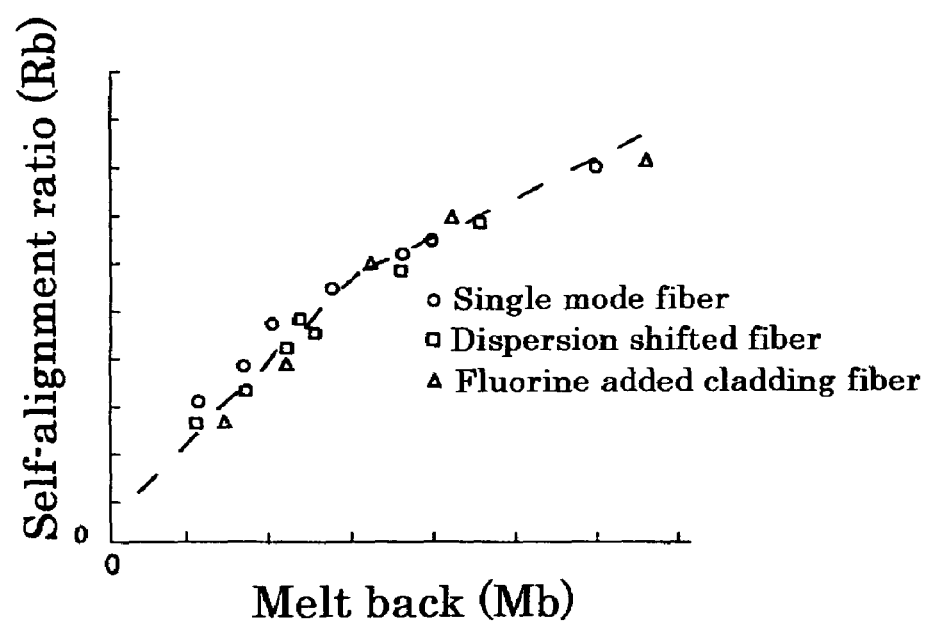
FIG. 3 is a graph showing the relationship between melt back and self-alignment ratio.

FIG. 3 is a graph showing the relationship between the melt back and the self-alignment ratio. The relationship shown in FIG. 3 can be obtained from FIG. 1C and FIG. 2C. From FIG. 3, it is clear that the relationship between the melt back Mb and the self-alignment ratio Rb does not vary depending on optical fiber type. Where a coefficient is K, this relationship can be expressed as, for example, $Rb=1-\exp(-K \times Mb)$. In addition, $Rb=K \times Mb^{1/2}$ is also an appropriate approximate expression. Using this expression, it is possible to estimate the self-alignment ratio from the melt back regardless of optical fiber type, and it is possible to estimate the self-alignment amount E by further detecting the fiber offset D. The preferred melt back varies depending on the optical fiber type, and thus is set by detecting the preferred discharge power during the test discharge.

Figure 4A:
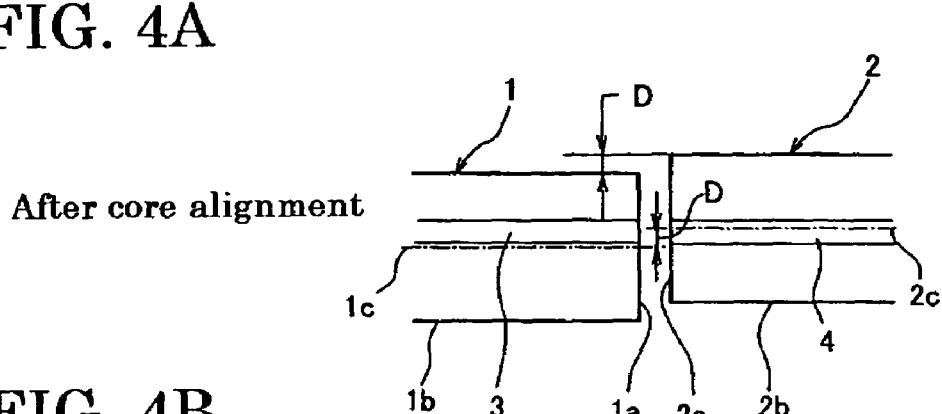
FIGS. 4A to 4C are schematic diagrams describing an embodiment of the method for fusion splicing optical fibers according to the present invention, where
Figure 4B:
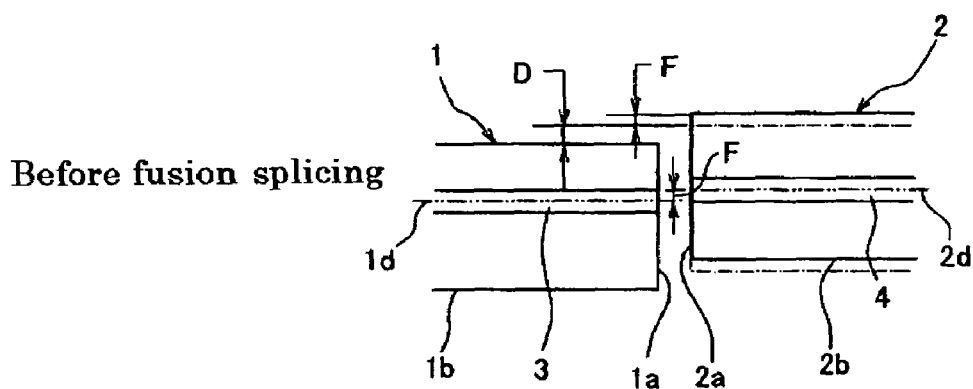
Figure 4C:
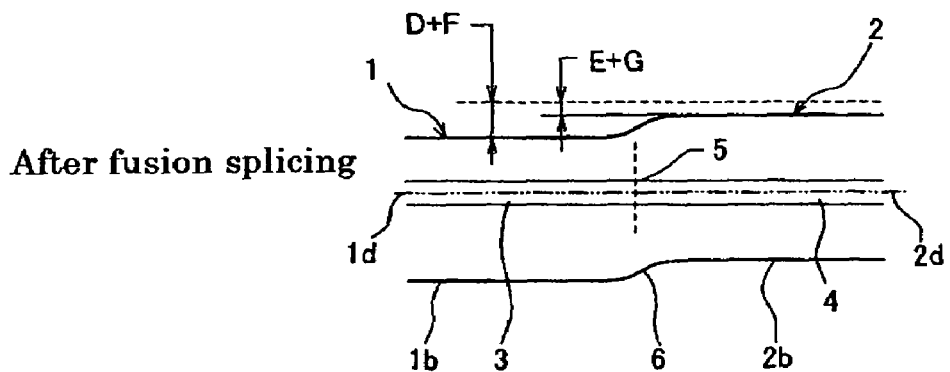

FIGS. 4A to 4C are schematic diagrams that describe an embodiment of the method for fusion splicing optical fibers according to the present invention, where FIG. 4A shows the condition after core alignment. The splicing ends 1a and 2a of the first optical fiber 1 and the second optical fiber 2 that are to be fusion spliced together are abutted with a prescribed gap interposed therebetween, and the optical fibers 1 and 2 are in core alignment. The cores 3 and 4 are decentered, so the fiber centers 1c and 2c do not align, and a fiber offset D is caused.

Based on the preferred melt back that is separately determined, the self-alignment ratio for the preferred melt back is estimated by using FIG. 3C, and the self-alignment value E is calculated using the fiber offset D that has been measured. Next, intentional offsetting (intentional offset F) is carried out to compensate for the self-alignment value. At this time, the over-all fiber offset is D+F (FIG. 4B).

Next, the region near the splicing ends 1a and 2a is heated and melted at a discharge power corresponding to the preferred melt back, and the splicing ends 1a and 2a are abutted by pressing each towards the other. FIG. 4C shows the condition after fusion splicing. The self-alignment effect acts on the fiber fused parts 6, and the offset decreases from the overall fiber offset D+F by the self-alignment value E+G. In this case, the self-alignment value E is the self-alignment value corresponding to the fiber offset D, and the self-alignment value G is the self-alignment value corresponding to the intentional offset F. In this case, by setting F=E+G, the core offset becomes 0 and, the core fusion part 5 of the cores 3 and 4 after fusion splicing, returns to a linear form with no bending, and loss due to the offset does not arise.

FIG. 5 is a schematic diagram that describes attenuation splicing as another embodiment of the method for fusion splicing optical fibers according to the present invention. Attenuation splicing is the fusion splicing of a first optical fiber 1 and a second optical fiber 2 in which the fusion-spliced part has a prescribed loss. Consequently, an offset is formed intentionally in the fusion-spliced part, so that a prescribed increase in loss arises.

Figure 5A:
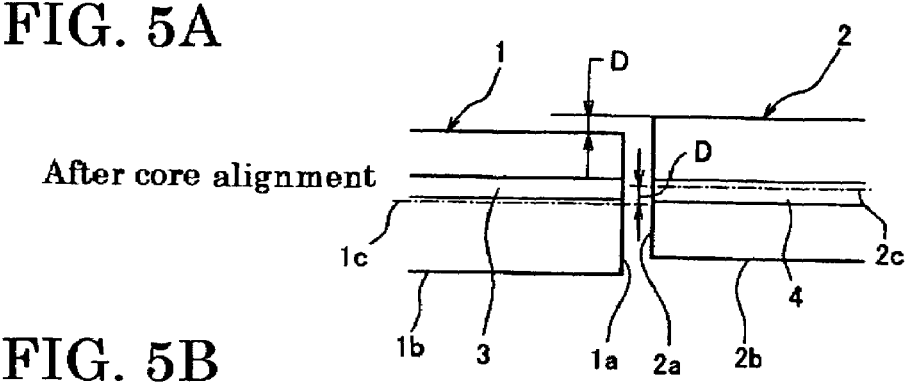
FIG. 5A shows the condition after core alignment.

FIG. 5A shows the condition after core alignment. The splicing ends 1a and 2a of a first optical fiber 1 and a second optical fiber 2 that are to be attenuation-spliced are abutted with a specified gap interposed therebetween, and core-alignment is carried out on the optical fibers 1 and 2. Cores 3 and 4 are decentered so that the fiber centers 1c and 2c do not align, resulting in the fiber offset D.

Figure 5B:
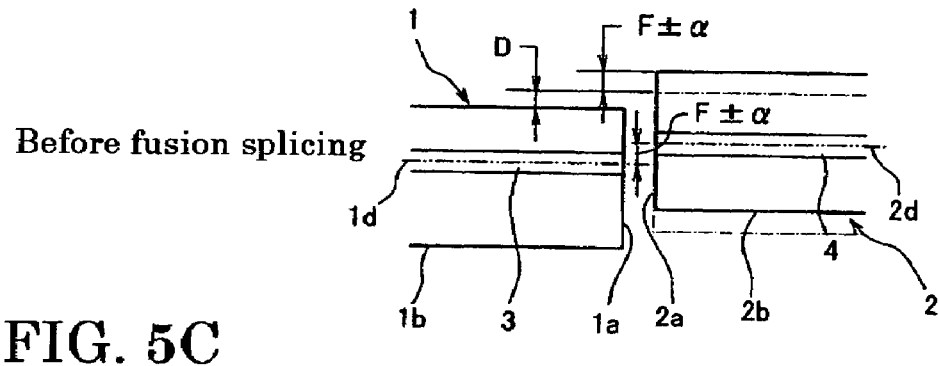
FIG. 5B shows the condition after axial offset.

Next, an overall offset in the attenuation splicing is set by adding an intentional offset a for intentionally providing a loss to the intentional offset F in order to cancel the loss subsequent to the fusion splicing described in FIG. 4 or subtracted the intentional offset a from the intentional offset F. When this overall offset F±α is added to the fiber offset D that is caused due to core alignment, the overall fiber offset prior to the fusion splicing becomes D+F±α (FIG. 5B).

Figure 5C:
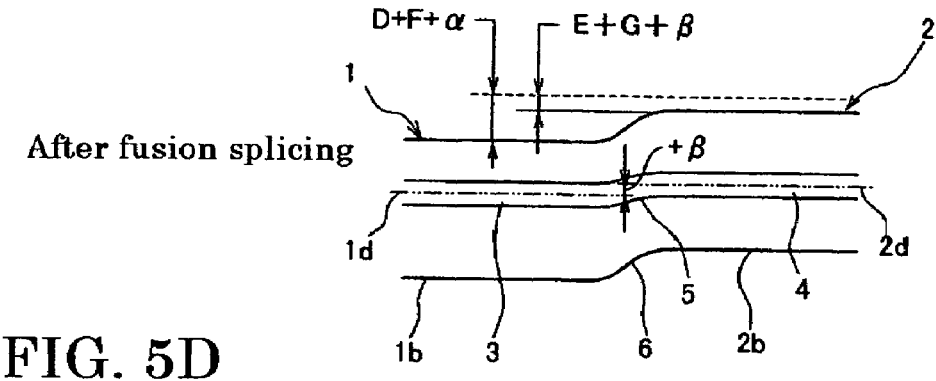
FIGS. 5C and 5D show the conditions after fusion splicing.

FIG. 5C shows the condition after the fusion splicing where the offset value a has been added to the intentional offset F. In this case, the overall fiber offset prior to the fusion splicing is D+F+α. Therefore, the overall self-alignment value is E+G+β, the sum of the self-alignment value E corresponding to the fiber offset D, the self-alignment value G corresponding to the offset value F, and the self-alignment value β corresponding to the offset value α. Thus, given that F=E+G, the total of the self-alignment value E and self-alignment value G is canceled by the offset F. As a result, it is possible to generate an increase in loss by an amount that corresponds to the core offset +α due to the self-alignment value +β that corresponds to the offset value +α.

Figure 5D:
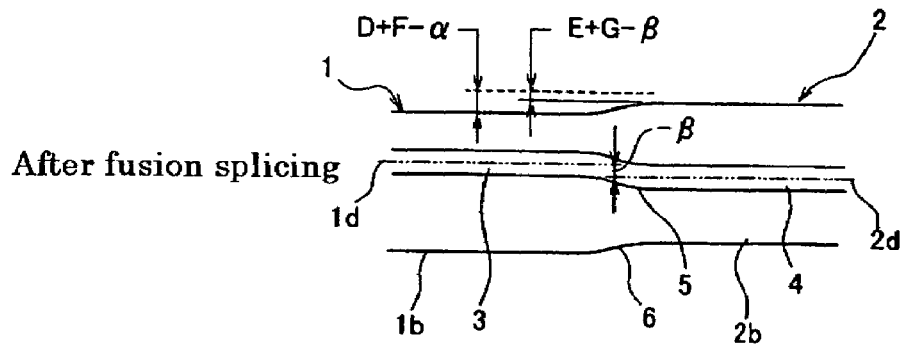

FIG. 5D shows the condition after the fusion splicing when the offset value a is subtracted from the intentional offset F. In this case, the overall fiber offset prior to the fusion splicing is D+F−α. Therefore, the overall self-alignment value is E+G−β, the sum of the self-alignment value E corresponding to the fiber offset D, the self-alignment value G corresponding to the offset value F, and the self-alignment value −β corresponding to the offset value −αa. Herein, given that F=E+G, an increase in loss by an amount that corresponds to the core offset −α can be caused due to the self-alignment value −β that corresponds to the offset value −α.

Figure 6:
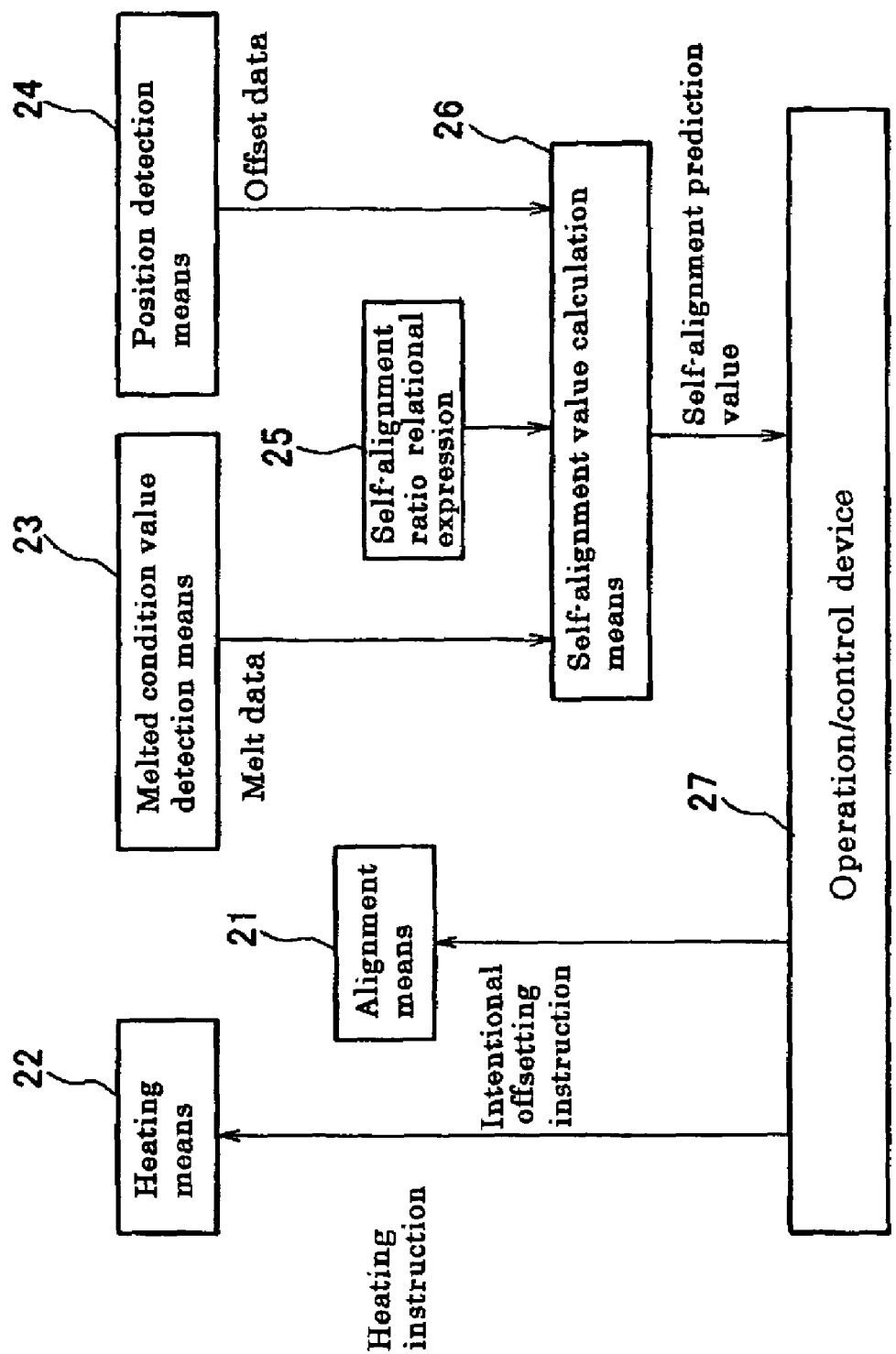
FIG. 6 is a block diagram that describes an embodiment of the optical fiber fusion splicer according to the present invention.

FIG. 6 is a block diagram that describes an embodiment of the optical fiber fusion splicer according to the present invention. The optical fiber fusion splicer in this embodiment has position detection means 24 for detecting the core position and fiber position in the abutting point of the optical fibers that are to be spliced together and for determining the fiber offset induced in core alignment of the optical fibers. The optical fiber fusion splicer also has alignment means 21 for aligning the optical fibers, and heating means 22 for heating and fusing the optical fibers. The position detecting means 24 may be a microscope and camera. The alignment means 21 may be a stage and motor. The heating means 22 may be a gas burner, laser, and discharge heating, but discharge heating is used in the example described herein. These means are the general means that constitute the optical fiber fusion splicer and that are operated automatically or manually while viewing an image with a liquid crystal monitor or the like.

In this embodiment, in addition to the above essential components, melted condition value detection means 23 for inspecting and calculating the melted condition value of the optical fiber is provided. The melted condition value is, for example, the melt back W2−W1. The melt back is measured by during a test discharge carried out prior to the fusion splicing.

As described in FIG. 1, the relationship between the discharge power and the melt back depends on the type of the optical fiber or on the operating environment. Consequently, the preferred melt back is preferably established each time prior to initiation of the fusion splicing when the optical fiber type is changed or when the operating environment charges. Once determined, the same settings may be maintained, provided that the same type optical fibers are spliced in the same splicing environment. However, when it is necessary to carry out a test discharge, it is preferable to re-obtain the preferred melt back as melt data.

This embodiment also has self-alignment value calculation means 26 that determines from the melt data the self-alignment ratio corresponding to the preferred melted condition value, based on a predetermined expression, e.g., $Rb=1-\exp(-K \times Mb)$, or $Rb=K \times Mb^{1/2}$, for a relationship between melt back and the self-alignment ratio. The self-alignment value calculation means 26 may be a microcomputer. The self-alignment value calculation means 26 also calculates the self-alignment predication value from the self-alignment ratio and the fiber offset measured by the position detection means.

The relationship between the melt back and the self-alignment ratio does not vary greatly depending on the optical fiber type. Consequently, it is possible to employ the relationship obtained by measurement for an optical fiber of a different type from the actual optical fiber that is to be fusion spliced. In this manner, even if the optical fiber type is not known, it is possible to calculate the self-alignment value for the optical fiber readily. As a result, it is possible to calculate the self-alignment prediction value accurately by merely determining the fiber offset detected in the core alignment of the optical fibers to be spliced, thereby allowing appropriate compensation for the offset.

At the time of test discharge, it is possible to measure the fiber offset D and self-alignment value E, and calculate and save a new expression for a relationship between melted condition value and self-alignment ratio each time. Higher precision can be attained by accumulation of measurement data. The melt data related to melt back and the like is appropriately updated at each fusion splicing operation, and an appropriate self-alignment ratio is always calculated, thereby allowing an accurate intentional offset.

After computing and setting the self-alignment ratio Rb of the optical fiber, it is possible to omit calculation of the optical fiber melt back and the self-alignment ratio when the same type of optical fibers are to be fused. Once the optical fibers that are to be spliced together are placed in the fusion splicer, and the offset data is measured by the position detection means 24, the offset data is input into the self-alignment calculation means 26 prior to heating and melting, and the self alignment prediction value can be calculated.

The self-alignment prediction value is then input into the operation/control device 27, and the intentional offset necessary for achieving the offset compensation is determined. The operation/control device 27 may be a microcomputer. The alignment means 21 is then additionally driven so that the determined intentional offset is added to the original offset caused due to the core alignment, and the fiber position is corrected. Subsequently, the operation control device 27 controls the heating-means 22 to heat at a discharge power corresponding to the preferred melt back, and fusion is carried out.

Figure 7:
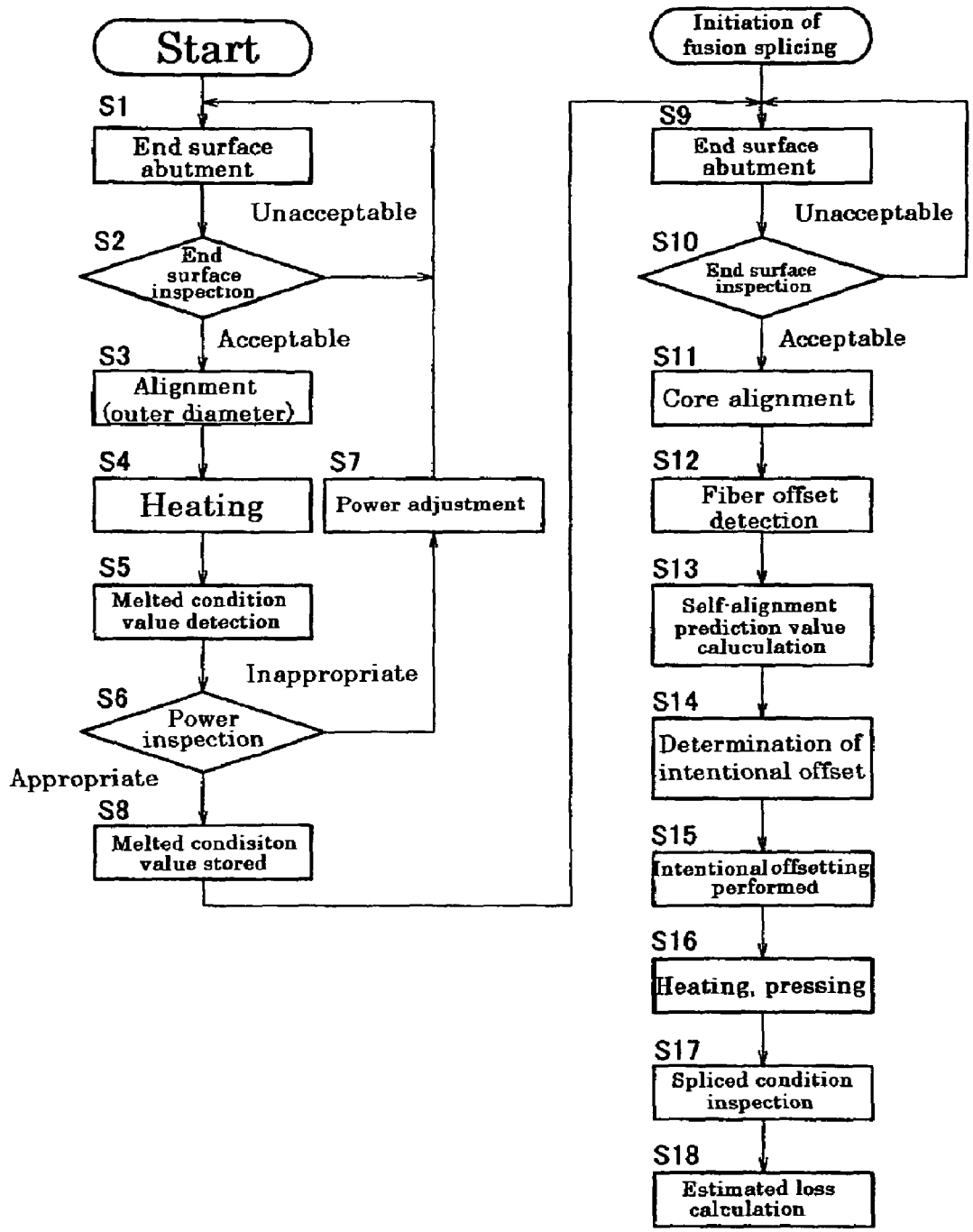
FIG. 7 is a flowchart describing an embodiment of the method for fusion splicing optical fibers according to the present invention.

FIG. 7 is a flowchart describing an embodiment of the method for fusion splicing optical fibers of the present invention. Prior to the fusion splicing that occurs subsequent to step S9, test discharge or the like is utilized in order to measure the melt back for the optical fiber. First, in step S1, optical fibers that are designed for testing and are of the same type as the optical fibers to be connected are held in a fusion splicer, and the ends to be spliced are displayed on a monitor screen or the like in a state where they are placed opposite to each other. Next, in step S2, the end surfaces of the optical fibers are inspected, and the favorability of the splicing ends is determined about parameters such as cutting conditions and adhesion of dust. If unsuitable, the procedure is repeated, and if suitable, the procedure advances to step S3 and alignment is performed. This alignment is carried out by aligning the fiber shapes such that the fiber positions correspond to each other. In addition, the gap between the abutted optical fibers is adjusted to a prescribed value.

Next, the optical fibers are heated and melted in step S4. At this point, the optical fibers are only heated and not pressed toward each other. Next, in step S5, the melted condition of the optical fiber splicing ends that have been heated and melted is observed, and a melted condition value such as the melting condition and the melt back is measured. When the melted condition is unsatisfactory in Step S6, the heating power is adjusted in Step S7 and the procedure is performed again. After this procedure is repeated a number of times, a suitable value for the heating power is determined. Next, in step S8, the suitable melted condition is recorded to prepare for fusion splicing. When there is no change in the optical fiber type or the splicing environment, step S1 to step S8 can be omitted.

Next, fusion splicing is initiated starting with step S9. In step S9, the optical fibers to be spliced are held in the fusion splicer, and, as in step S1, the splicing ends are displayed on a monitor screen or the like in a state where they placed opposite to each other. Next, in step S10, the end surface are inspected in the same manner as in step S2, and the condition of the splicing ends is determined in regard to parameters such as cutting conditions and adhesion of dust. If unacceptable, the procedure is repeated, and if acceptable, the procedure advances to step S11, where alignment is performed. Alignment in step S11 is core alignment where the core positions are aligned.

Next, the fiber offset is detected in Step S12. Fiber offset is input as offset data into the self-alignment value calculation means. The expression for a relationship between the self-alignment ratio and the predetermined melt back, along with the melt data previously recorded in step S1 to step S8, are input into the self-alignment value calculation means. In step S13, the self-alignment ratio of the optical fiber is calculated from the expression, and the self-alignment prediction value is calculated from the offset data.

Next, in step S14, the intentional offset value is determined by the operation/control device based on the self-alignment prediction value. In step S15, the intentional offset is carried out using the alignment means immediately prior to the fusion splicing of the optical fibers. Next, in step S16, the splicing ends of the optical fibers are heated and melted, and fusion is brought about by pressing the optical fibers together towards each other. As a result, fusion is brought about in a state in which there is no core offset after the fusion due to the self-alignment effect. In addition, as described in FIG. 5, when the offsetting is carried out intentionally so that there is an increase in loss, fusion is brought about so that a prescribed offset is caused in the core axes after the fusion.

After the fusion splicing, the condition of the spliced region is investigated in step S17. If there are no abnormalities, the core offset and other parameters are measured in the fused region in step S18, and the splicing loss is estimated. Instead of estimating the splicing loss, measurements may be performed by an optical power meter connected to the optical fiber.

Figure 8:
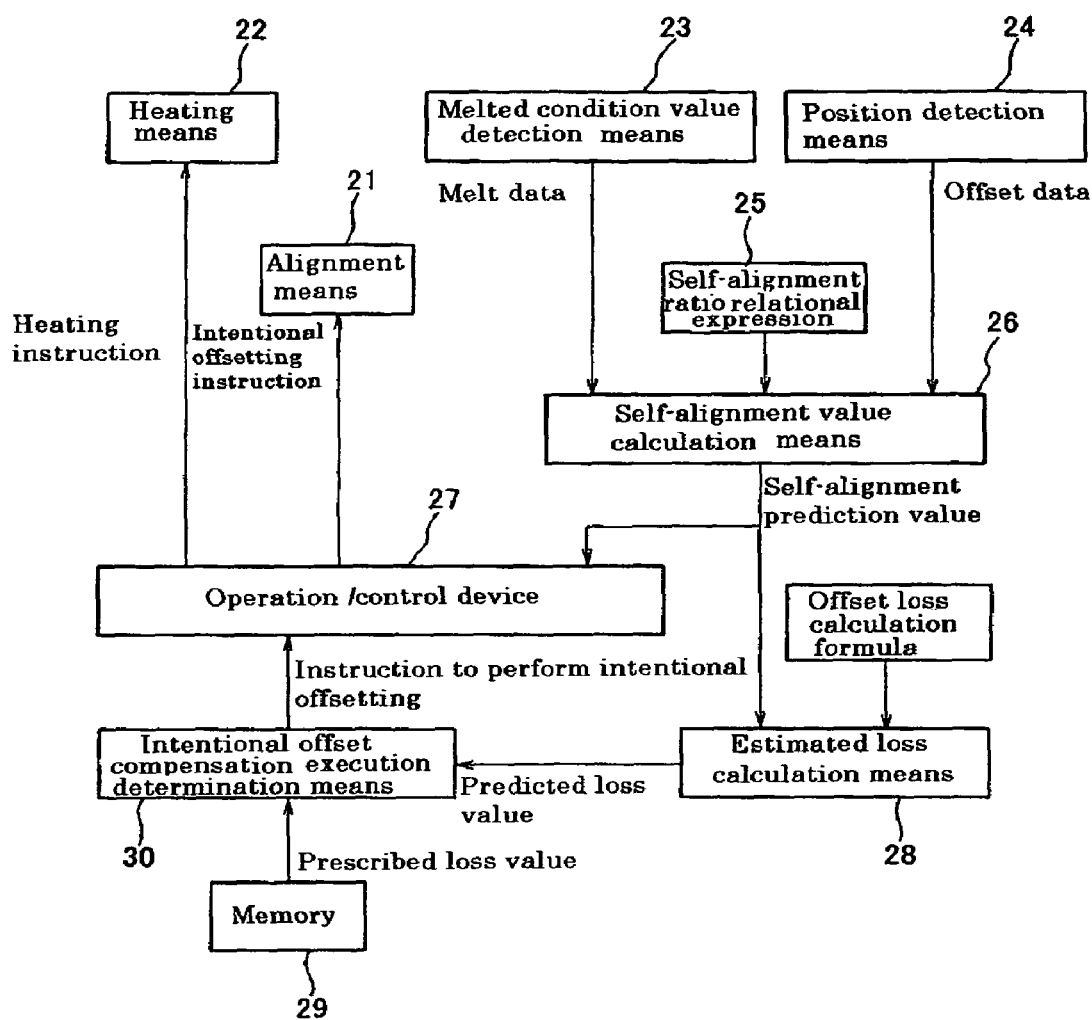
FIG. 8 is a block diagram that describes another embodiment of the optical fiber fusion splicer according to the present invention.

FIG. 8 is a block diagram describing another embodiment of the optical fiber fusion splicer according to the present invention. The processes up to the calculation of the self-alignment prediction value by the self-alignment value calculation means 26 are the same as in FIG. 6, and thus descriptions regarding these processes are omitted. In this embodiment, an estimated loss calculation means 28 that estimates the loss by predicting the core offset from the self-alignment prediction value calculated by the self-alignment value calculation means 26 is provided. In estimating the loss from the predicted core offset, for example, the Marcuse formula may be used ($L=4.34(T^2/W^2)$; where L is the estimated loss, T is the core offset, and W is the fiber spot size).

The calculated predicted loss value is input into the intentional offset compensation execution determination means 30, and is compared with the specified loss value that was previously recorded in the memory 29. This specified loss value can be arbitrarily set for each optical fiber type; for example, 0.03 dB for step-index (SI) single mode optical fibers, and 0.05 dB for dispersion-shifted optical fibers.

In the intentional offset compensation execution determination means 30, the predicted loss value is compared with the specified loss value, and, if the predicted loss value is smaller, then a determination is made that an offset compensation by the intentional offsetting is not to be performed. Based on the determination that the offset compensation is unnecessary, an instruction indicating that the intentional offsetting is not to be performed is output to the operation/control device 27. The heating means 22 is operated, and fusion is immediately performed without intentional offsetting operation at the alignment means 21.

If the predicted loss value is greater than the specified loss value, then a determination is made that an offset compensation is to be carried out by intentional offsetting. Based on the determination that an offset compensation is necessary, an instruction is output to the operation/control device 27 to perform intentional offsetting. The operation/control device 27 then determines the amount of intentional offsetting based on the self-alignment prediction value in the same manner as in FIG. 6, drives the alignment means 21, and performs the intentional offsetting. Next, heating is carried out by the heating means 22 so that the prescribed melt back is created at the predetermined discharge power, and fusion is performed.

By providing the compensation execution determination means 30, it is possible to avoid the redundancy of performing the offset compensation when the predicted loss value is small and the resulting loss can meet the prescribed value sufficiently without the offset compensation operation, and therefore the splicing operation can be made more effective.

Figure 9:
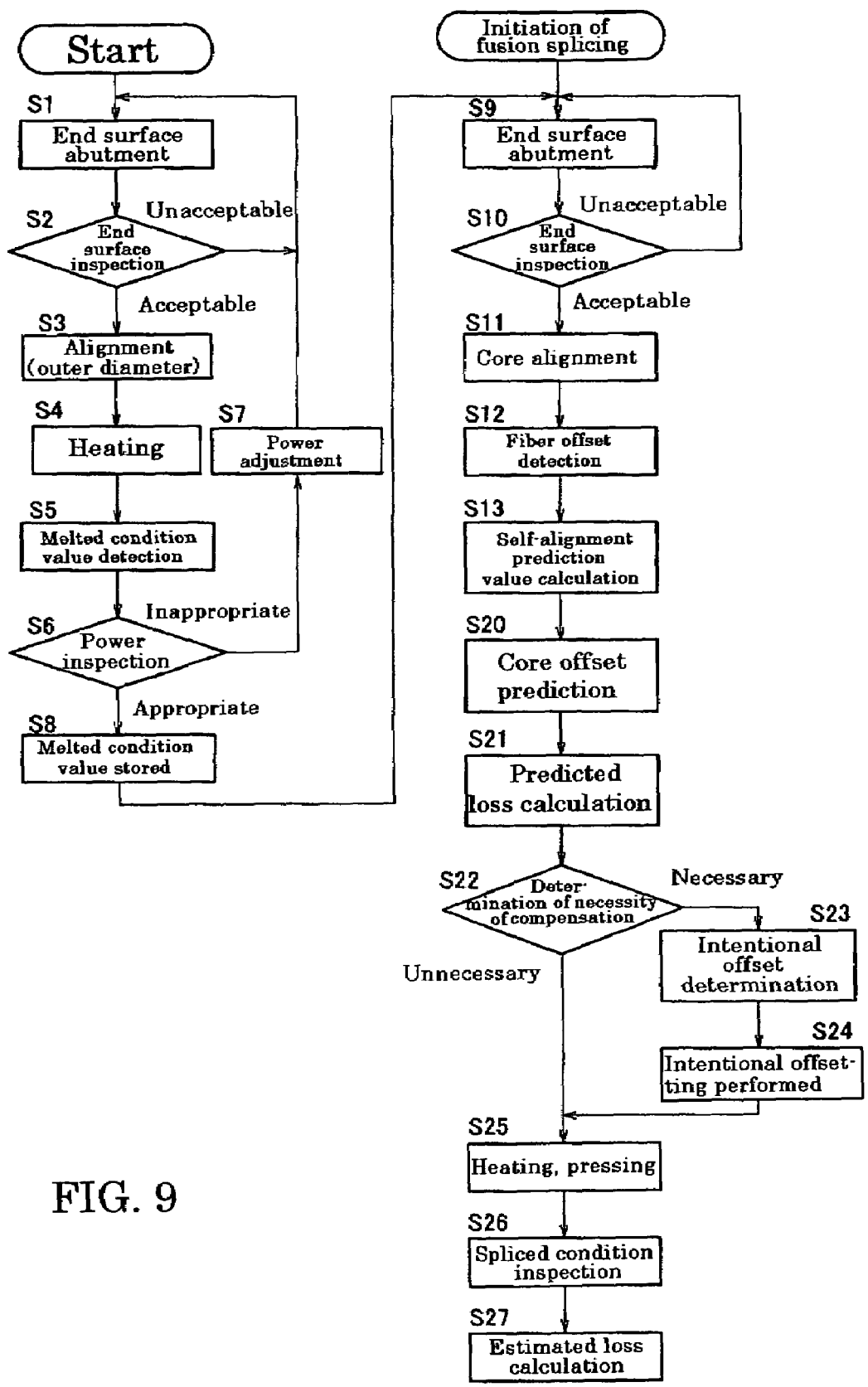
FIG. 9 is a flowchart describing another embodiment of the method for fusion splicing optical fibers according to the present invention.

FIG. 9 is a flowchart that describes another embodiment of the method for fusion splicing optical fibers according to the present invention. Steps S1 to S13 are the same as those in the example presented in FIG. 7, and therefore descriptions thereof are omitted. The core offset is predicted in step S20 based on the self-alignment prediction value calculated in step S13. Next, the predicted loss value is estimated by calculation using the relational formula of the core offset and the splicing loss in step S21. In step S22, the predicted loss value is then compared with the specified loss value that has been previously set and a determination is made as to the necessity of performing an offset compensation.

If the determination is made that an offset compensation is not necessary, then the process advances to step S25 where the splicing ends of the optical fibers are heated and melted, and fusion is performed by pressing them towards each other. If a determination is made that an offset compensation is required, then the process proceeds to step S23, and the intentional offsetting is determined in accordance with the self-alignment prediction value calculated in step S13. Next, immediately prior to the fusion splicing of the optical fibers in step S24, the alignment means is used in order to carry out the intentional offsetting. Subsequently, the process proceeds to step S25, and the splicing ends of the optical fibers are melted by heating and fused by being pressed together towards each other.

Due to the self-alignment effect, it is possible to achieve fusion in a state in which there is no core offset. In addition, when the intentional offsetting has been carried out in order to increase the loss intentionally, the fusion is carried out so that the prescribed core offset is created after the fusion. After the fusion splicing, the condition of the spliced region is inspected in step S26, and if no abnormalities are present, then the core offset and other properties of the fused region are measured in step S27, and the splicing loss is estimated. Instead of estimating the splicing loss, measurements may be performed by an optical power meter connected to the optical fiber.

In performing the prescribed offset compensation, the amount of intentional offsetting may be set somewhat above the target value, and heating of the optical fiber may be divided into multiple iterations. Specifically, by incrementally carrying out multiple repetitions of discharge while controlling the discharge power, rather than heating and melting the optical fiber all at once in a single heating iteration, the target value can be approached by gradually generating the offset, and heating can be stopped at the point when the offset has reached the target value. In this manner, it is possible to increase the precision of offset after the fusion splicing. When the amount of intentional offsetting is insufficient, it is possible to perform a correction by additional heating.

While this invention has been described in connection with what is presently considered to be the most practical and preferred embodiments, the invention is not limited to the disclosed embodiments, but on the contrary, is intended to cover various modifications and equivalent arrangements included within the spirit and scope of the appended claims.

The entire disclosure of Japanese patent Application No. 2004-346590 filed on Nov. 30, 2004, including specification, claims, drawings, and summary are incorporated herein by reference in its entirety.

The invention claimed is:

1. An optical fiber fusion splicer comprising
   (a) position detection means for detecting core positions and fiber positions at an abutting point of optical fibers that are to be spliced, and obtaining a fiber offset that is caused when said optical fibers are in core alignment;
   (b) alignment means for aligning said optical fibers;
   (c) heating means for heating and fusing said optical fibers;
   (d) melted condition value detection means for inspecting and measuring the melted condition value;
   (e) self-alignment value calculation means for obtaining a self-alignment ratio that corresponds to a preferred melted condition value, based on a predetermined expression for a relationship between melted condition value and self-alignment ratio, and for calculating the self-alignment prediction value from said self-alignment ratio and said fiber offset;
   (f) control means for determining an intentional offset that is based on said self-alignment prediction value and causes a prescribed splicing loss and controlling said alignment means;
   (g) estimated loss calculation means for predicting a core offset at the time of fusion based on said self-alignment prediction value, and estimating a predicted loss value based on a formula expressing a relationship between splicing loss and core offset; and
   (h) intentional offset compensation execution determination means for comparing the specified loss value and the predicted loss value estimated by said estimated loss calculation means, and determining whether an intentional offset compensation is necessary.

2. An optical fiber fusion splicer comprising
   (a) position detection means for detecting core positions and fiber positions at an abutting point of optical fibers that are to be spliced, and obtaining a fiber offset that is caused when said optical fibers are in core alignment;
   (b) alignment means for aligning said optical fibers;
   (c) heating means for heating and fusing said optical fibers;
   (d) melted condition value detection means for inspecting and measuring the melted condition value;
   (e) self-alignment value calculation means for obtaining a self-alignment ratio that corresponds to a preferred melted condition value, based on a predetermined expression for a relationship between melted condition value and self-alignment ratio, and for calculating the self-alignment prediction value from said self-alignment ratio and said fiber offset; and
   (f) control means for determining an intentional offset that is based on said self-alignment prediction value and causes a prescribed splicing loss and controlling said alignment means;

wherein said melted condition value is melt back.

3. A method for fusion spicing optical fibers, comprising the steps of:
- (a) detecting fiber positions and core positions of optical fibers to be spliced at an abutting position and a fiber offset that is caused when said optical fibers are in core alignment;
- (b) obtaining a self-alignment ratio corresponding to a preferred melted condition value based on a predetermined expression for a relationship between melted condition value and self-alignment ratio,
- (c2) obtaining, from said fiber offset and said self-alignment ratio, a predicted loss and core offset produced that is caused when fusion splicing is performed while said optical fibers are in core alignment,
- (e2) determining whether fiber position correction is necessary by comparing said predicted loss and a specified loss,
- (f2) when necessary, determining, from said fiber offset and said self-alignment ratio, an intentional offset value that achieves the prescribed offset, and heating and fusing said optical fibers in a state in which said core positions are offsetting by said intentional offset value; and
- (g2) when not necessary, heating and fusing said optical fibers in a state in which said optical fibers are in core alignment.

* * * * *